United States Patent [19]

Hager

[11] 4,384,750
[45] May 24, 1983

[54] MAGNETIC PLATE STORE

[75] Inventor: Horst Hager, Paderborn, Fed. Rep. of Germany

[73] Assignee: Hightrack Computer Technik GmbH, Berlin, Fed. Rep. of Germany

[21] Appl. No.: 118,068

[22] Filed: Feb. 4, 1980

[30] Foreign Application Priority Data

Feb. 10, 1979 [DE] Fed. Rep. of Germany ....... 2905414

[51] Int. Cl.³ .................... A47B 81/06; A47G 29/02
[52] U.S. Cl. .................................. 312/8; 312/284; 312/296; 248/250; 248/632
[58] Field of Search ................ 312/8, 9, 10, 296, 284; 248/632, 634, 206 A, 235, 250

[56] References Cited

U.S. PATENT DOCUMENTS

| | | | |
|---|---|---|---|
| 2,358,917 | 9/1944 | Emde | 312/8 |
| 2,553,960 | 5/1951 | De Swart | 248/250 |
| 2,627,556 | 2/1953 | Peterson et al. | 312/8 |
| 3,441,331 | 4/1969 | Kesling | 248/206 A |
| 3,482,910 | 12/1969 | Debelius | 248/206 A |
| 3,628,762 | 12/1971 | Williams | 248/235 |
| 3,652,142 | 3/1972 | Kreutzweiser | 312/284 |
| 3,782,801 | 1/1974 | Zimmermann | 312/284 |
| 3,850,342 | 11/1974 | Dsjuba | 312/284 |
| 3,954,243 | 5/1976 | Sharp et al. | 248/235 |
| 4,037,813 | 7/1977 | Loui et al. | 248/250 |
| 4,214,797 | 7/1980 | Borresen et al. | 312/284 |
| 4,260,208 | 4/1981 | Lun Ho et al. | 248/632 |

FOREIGN PATENT DOCUMENTS

| | | | |
|---|---|---|---|
| 260460 | 3/1968 | Austria | 248/250 |
| 462219 | 1/1950 | Canada | 248/632 |
| 1038791 | 5/1955 | Fed. Rep. of Germany | 312/8 |

Primary Examiner—Victor N. Sakran
Attorney, Agent, or Firm—Michael J. Striker

[57] ABSTRACT

A housing for a magnetic disk memory is assembled of a lower part and cup-shaped upper part which is seated on the rim of the lower part. A continuous angular bracket is secured to the inner surface of the lower arm and overlaps vertically the rim of the latter. An elastic sleeve has a mounting groove engaging the inwardly projecting arm of the bracket, and another mounting groove engaging a plate for supporting a rotary drive for the disks and a magnetic head assembly. The elastic sleeve further includes a flexible lip which abuts against a continuous shoulder on the inner surface of the upper housing part to seal the interior of the housing against outer atmosphere.

5 Claims, 3 Drawing Figures

U.S. Patent May 24, 1983 4,384,750
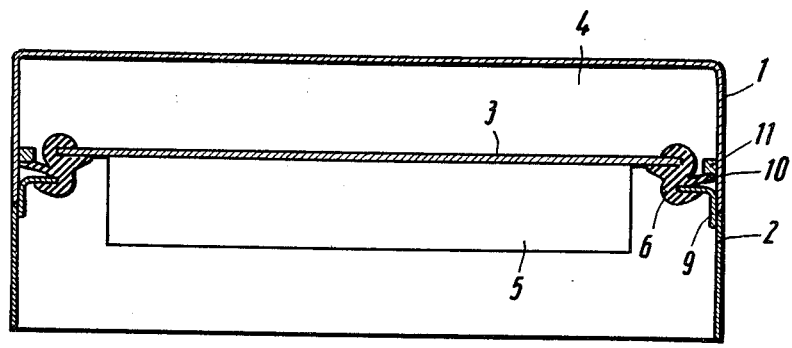
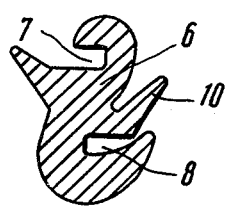
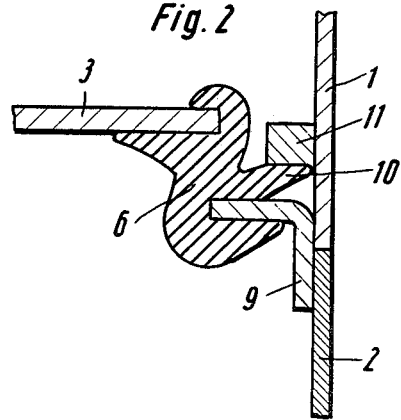

MAGNETIC PLATE STORE

BACKGROUND OF THE INVENTION

The invention concerns a housing, closed off to be air-tight, for the receiption of rotary magnetic disks and for mounting a magnetic head arrangement and its supporting body for the disks and for mounting the driving equipment for the disks.

In magnetic disk memory units, it is required to eliminate mechanical oscillations from the recording and reproduction system, since these can impair the recording and reading process. Therefore, the parts carrying the recording and reproduction system of the magnetic disk memory are used for the antivibration fastening of the recording and reproduction system but a rigid connection of the system with the outer housing parts cannot be completely eliminated. For this reason, a suppression of vibrations can take place only to a limited degree.

It is, therefore, an object of the present invention to provide a magnetic disk memory unit, in which the mounting of the recording and reproduction system in the housing is attained with an adequate suppression of mechanical oscillations acting on the memory from outside.

SUMMARY OF THE INVENTION

According to the invention this problem is solved by the provision of a supporting member for the memory system which is mounted in a lower housing part and insulated against vibrations by a sleeve of elastic material which continuously embraces the outer rim of the supporting member. Preferably, the sleeve is formed with longitudinal grooves for the reception of the outer rim of the supporting body and for engaging a mounting bracket secured to the interior of the lower housing part. The sleeve advantageously carries an additional lip for an air-tight closure between upper and lower housing parts.

The invention is explained more closely in the following description by reference to an exemplary embodiment.

BRIEF DESCRIPTION OF THE DRAWING

FIG. 1 is a vertical section through a housing of a simplified embodiment of the magnetic disk memory unit of this invention;

FIG. 2 shows on an enlarged scale the connection between the supporting member and the upper and lower housing parts according to FIG. 1; and FIG. 3 is a cross-section of an anti-vibration sleeve in its undeformed state.

DESCRIPTION OF THE PREFERRED EMBODIMENT

The housing of the magnetic disk memory unit consists of a cup-shaped upper part 1 and a lower part 2. The upper part 1 together with a plate-shaped supporting body 3 mounted in the housing encloses a space 4 which is sealed off to be air-tight. Disposed in this space 4 and fastened to the supporting body 3 is a not-illustrated magnetic head system for the magnetic disks. The body 3 furthermore at its underside carries a driving device 5 for rotating the magnetic disks.

The fastening of the supporting body 3 in the housing part is effected by means of a sleeve 6 of elastic material, preferably of rubber, continuously encircling the outer rim of body 3. The sleeve 6 is formed with elongated grooves 7 and 8, which serve for the reception of the outer rim of the body 3 and for engaging a horizontal arm of continuous angular bracket 9 is secured to the inner surface of the lower housing part 2. The bracket 9 overlaps vertically the rim of the lower housing part 2 and its horizontal arm overlaps the end of the body 3 to assure the rigidity of the connection between the supporting body 3 and the housing part 2. The body 3 is thus connected with the outer housing only by the elastic sleeve 6. Mechanical oscillations acting from outside are largely suppressed by the elastic sleeve 6 and thereby not transmitted to the magnetic recording and reproduction system. The elasticity of the sleeve is selected such that the damping of vibrations takes place predominently in the frequency range above 200 Hertz, since vibrations of lower frequency are compensated by corresponding countermovements of the magnetic heads.

The sleeve 6 furthermore is formed with a flexible sealing lip 10, which during the placing of the upper housing part 1 into the lower part 2 is bent between a rigid strip 11, which is secured to the inner surface of the upper part 1 and the bracket 9.

FIG. 3 shows the sleeve 6 in its undeformed condition. The grooves 7 and 8 are resiliently enlarged when fitting in the supporting body 3 or the bracket 9 so that a firm seat is assured. The lip 10 is pressed downwardly by the strip 11 when the upper part 1 is placed on so that it bears firmly against this and secures an air-tight closure.

It will be understood that each of the elements described above, or two or more together, may also find a useful application in other types of constructions differing from the types described above.

What is claimed as new and desired to be protected by Letters Patent is set forth in the appended claims:

1. A housing for a magnetic disk memory assembly, comprising a lower housing part having an open rim, and a cup-shaped upper housing part seating on said rim, a continuous angular bracket having one arm which is connected to the inner surface of the lower part and overlaps said rim, and another arm projecting into the housing; a continuous sleeve of an elastic material engaging said other arm of the bracket; a supporting plate arranged in said housing for supporting said memory assembly, said plate continuously engaging said sleeve at a spaced relationship with said bracket to suppress the transmission of vibrations from said housing to said memory assembly.

2. A housing as defined in claim 1, wherein said sleeve is formed with a first groove for engaging said bracket and with a second groove spaced apart from said first groove for engaging said plate.

3. A housing as defined in claim 1, wherein said supporting plate and said other arm of the bracket overlap one another.

4. A housing as defined in claim 1, wherein said sleeve is formed with a lip for sealingly engaging the inner surface of said upper part.

5. A housing as defined in claim 4, wherein the inner surface of said upper part is formed with a continuous peripheral strip for engaging said sealing lip.

* * * * *